United States Patent
Aasted et al.

(10) Patent No.: US 9,235,577 B2
(45) Date of Patent: Jan. 12, 2016

(54) FILE TRANSFER USING STANDARD BLOCKS AND STANDARD-BLOCK IDENTIFIERS

(75) Inventors: Matthew Aasted, Cambridge, MA (US); Meera Shah, Pittsburgh, PA (US); Saman P. Amarasinghe, Cambridge, MA (US); Timothy Garnett, Boston, MA (US)

(73) Assignee: VMware, Inc., Palo Alto, CA (US)

( * ) Notice: Subject to any disclaimer, the term of this patent is extended or adjusted under 35 U.S.C. 154(b) by 1801 days.

(21) Appl. No.: 12/399,871

(22) Filed: Mar. 6, 2009

(65) Prior Publication Data

US 2010/0057750 A1    Mar. 4, 2010

Related U.S. Application Data

(60) Provisional application No. 61/094,215, filed on Sep. 4, 2008.

(51) Int. Cl.
*G06F 7/00* (2006.01)
*G06F 17/30* (2006.01)

(52) U.S. Cl.
CPC .... *G06F 17/30067* (2013.01); *G06F 17/30097* (2013.01); *G06F 17/30156* (2013.01)

(58) Field of Classification Search
CPC .................. G06F 17/30067; G06F 17/30156; G06F 17/30115; G06F 17/30283; G06F 12/17; F06F 17/30097
See application file for complete search history.

(56) References Cited

U.S. PATENT DOCUMENTS

| | | | | |
|---|---|---|---|---|
| 5,355,481 A * | 10/1994 | Sluijter | ............. | G06F 17/30952 1/1 |
| 5,765,165 A * | 6/1998 | Harper | ............. | G06F 17/30958 1/1 |
| 5,809,494 A * | 9/1998 | Nguyen | ............ | G06F 17/30949 1/1 |
| 5,864,857 A * | 1/1999 | Ohata | ............... | G06F 17/30333 1/1 |
| 6,014,730 A * | 1/2000 | Ohtsu | ....................... | G06F 9/52 711/130 |
| 6,068,663 A * | 5/2000 | Ura | ..................... | G06F 17/5036 716/102 |
| 6,202,203 B1 * | 3/2001 | Ng | ........................... | G06F 8/443 717/151 |
| 7,043,637 B2 * | 5/2006 | Bolosky | ............ | G06F 17/30097 707/E17.01 |
| 7,379,940 B1 * | 5/2008 | Baron | ..................... | H03M 7/30 1/1 |
| 7,454,612 B2 * | 11/2008 | Bolosky | ............ | G06F 17/30097 707/E17.01 |
| 7,797,393 B2 * | 9/2010 | Qiu | ......................... | G06F 21/80 709/212 |
| 2006/0259949 A1 * | 11/2006 | Schaefer | ........... | G06F 17/30082 726/1 |

* cited by examiner

*Primary Examiner* — Daniel Kuddus

(57) ABSTRACT

Instead of transferring a large original file from a source system to a target system, the original file is encoded to define a recipe. The recipe is then decoded to yield a duplicate of the original file on the target system. Encoding involves identifying standard blocks in the original file and including standard-block identifiers for the standard blocks in the recipe in lieu of the original blocks. Decoding involves an exchange with a standard-block identifier server system, which provides standard blocks in response to received standard-block identifiers.

14 Claims, 8 Drawing Sheets ing file blocks is transferred in lieu of the original file. Since SBIDs and compressed file blocks are much smaller than original blocks, the bandwidth required to transfer the file is greatly reduced.

FILE TRANSFER USING STANDARD BLOCKS AND STANDARD-BLOCK IDENTIFIERS

This application claims the benefit of U.S. Provisional Application No. 61/094,215 filed on Sep. 4, 2008.

BACKGROUND

A virtual machine, including one or more guest operating systems and application programs, can be represented by a virtual-machine image file. Accordingly, virtual machines can be cloned and transferred using conventional file operations (duplicate, move, copy-and-paste).

Each virtual machine is self-contained in a virtual-machine image file. This file resides on a host machine. The virtual-machine image file can be copied and transferred, e.g., over a network. If the machine has to be moved from one physical location to another, it only requires copying the virtual machine image file from the host machine at the first location to another host machine at the second location over a computer network. However, as the virtual machine image files are very large, copying a virtual machine image requires a high bandwidth connection and can take a substantially long time.

While each virtual machine image file can take gigabytes to store, a large amount of the content in these virtual machine files is the same in many of them. This is due to the fact that today's software and operating systems are a monoculture. There are only a few variations of operating systems such as Windows XP™, Windows Vista™ and Redhat™ Linux. Additionally a handful of applications take up a large part of the application suite on each machine. Thus, it is observed that when a virtual machine image file is copied from one location to another, most of the information copied is already present in other virtual machine files at the destination.

SUMMARY

In a first aspect, the present invention provides a system comprising a SBID-to-S-block converter for returning over a network to a target system a version of a standard data block in response to a respective standard-block identifier received over said network from said target system. The SBID-block converter stores versions of plural standard data blocks and standard hashes generated from respective copies of said standard data blocks. The SBID-block converter associates respective standard-block identifiers with respective ones of said standard data blocks. The system also includes a hash-to-SBID converter for returning over said network to a source system a first standard-block identifier for a first of said standard data blocks in response to a reception by said hash-to-SBID converter from said source system of a first file hash matching a first standard hash generated from said first standard data block.

In a second aspect, the present invention provides a method comprising converting on a source system an original file into original blocks; generating file hashes from said original blocks; transmitting some of said file hashes over a network to a SBID server system; distinguishing file hashes that match standard hashes generated from standard blocks from those that do not match said standard hashes; for each of said file hashes that matches a standard hash, returning a respective standard-block identifier to said source system; generating a recipe file including said standard-block identifier; and transferring over said network said recipe file to a target system.

In a third aspect, the present invention provides a manufacture comprising computer-readable storage media encoded with standard data blocks and programs of computer-executable instructions, said programs providing for: dividing an original file into uncompressed file blocks; compressing said uncompressed file blocks to yield compressed file blocks; generating file hashes from said compressed file blocks; for each of said file hashes, as it becomes a currently-processed file hash, determining whether it matches a previously-processed file hash represented in an entry in an table that associates previously-processed file hashes with file-block identifiers; in the event a currently-processed file hash matches a previously-processed file hash, associating a file-block identifier for the currently-processed file hash with a file-block identifier for the matching previously-processed file hash, and in the event a currently-processed file hash does not match a previously-processed file hash, transmitting the currently-processed file hash to a SBID server system and, if a SBID indicting that that hash corresponds to standard block is returned from said SBID server system, including that SBID in said recipe file.

In the figures: a "B-block" is one of many blocks into which a file is divided; a "C-block" is a compressed version of a B-block; and a "D-block" is a decompressed version of a C-block. A "B-hash" is a hash generated directly from a B-block; a C-hash is a hash generated from a C-block; a "CQ-hash" is a "query" C-hash that is transmitted across a network, while a "CR-hash" is a (non-CQ-hash) "reference" C-hash that matches a previously generated CQ-hash. "FBID" stands for "File-block identifier"; each B-block, C-block, D-block, B-hash, C-hash, CQ-hash, and CR-hash corresponds to a respective FBID. An "SU-block" is an uncompressed standard block to which a standard-block identifier (SBID) has been assigned. An "S-block" is a compressed version of an SU-block.

DETAILED DESCRIPTION

The present invention addresses these and related problems by substituting standard-block identifiers (SBIDs) for at least some blocks of a file to be transferred. More specifically, an original file is divided into file blocks; these blocks are compressed and file hashes are generated from the file blocks and compared with "standard" hashes generated from a pre-existing set of standard blocks. A recipe file including SBIDs for matching file blocks and compressed versions of non-matching file blocks is transferred from a source system to a target system. A duplicate of the original file is constructed on the target system in part by exchanging transferred SBIDs for the standard blocks they represent. While it can be used for transferring a variety of file types, this SBID-based approach has particular applicability to virtual machines. Virtual machines often share common host and guest software, so shared data blocks are relatively prevalent. Furthermore, since a virtual machine disk (vmdk) file is an image of a file system, the blocks from a file system tend to be well aligned.

Figure 1:
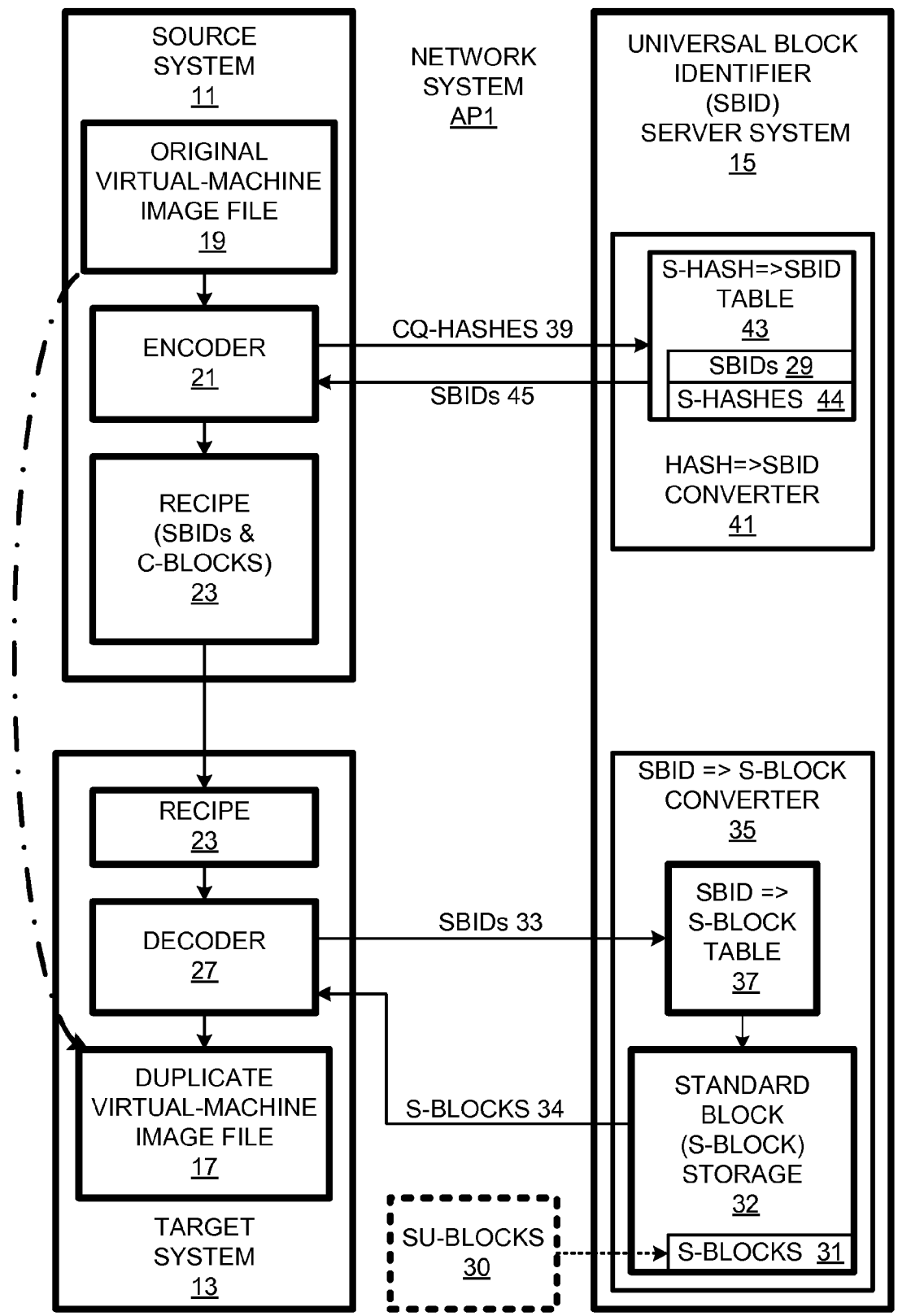
FIG. 1 is a schematic diagram of a network system of computer systems in accordance with an embodiment of the invention.

A network system AP1 in accordance with the invention is schematically illustrated in FIG. 1. Generally, the invention provides for a variety of network systems, including local-area networks (LANs), wide-area networks (WANs), the Internet, and combinations of these. Network system AP1 includes and provides for connectivity among a source system 11, a target system 13, and a standard-block identifier (SBID) server system 15. In general, the invention provides for source systems, target systems, and SBID server systems that are individual computers or that are themselves networks of computers. In some embodiments of the invention, two or more of the source, target, and SBID server systems are run on separate resources on the same computer.

The objective of interest herein is to create on target system 13 a duplicate virtual-machine image file 17 from an original virtual machine image file 19 on source system 11. To this end, an encoder 21 of source system 11 encodes relatively large original file 19 to yield a relatively small recipe file 23 on source system 11. Recipe file 23 on source system 11 is transferred (instead of original file 19) to target system 13. A decoder 27 on target system 13 decodes recipe file 23 to yield duplicate file 17.

Recipe file 23 can include "standard-block identifiers" or "SBIDs" 29. SBIDs 29 represent respective uncompressed standard blocks or "SU blocks" 30, and, thus, compressed versions of those blocks, namely, compressed standard blocks or "S-blocks" 31, which are stored at standard block storage 32. Decoder 27 transmits SBIDs 33 from recipe file 23 over network system AP1 to SBID server system 15, where SBIDs 33 are received by a SBID-to-S-block converter 35. Converter 35 includes storage 32 and a SBID-to-S-block table 37 that maps SBID values to S-blocks 31. For each SBID value received from target system 13, SBID server system 15 returns a version of the corresponding S-block. In the illustrated embodiment, the S-blocks are compressed versions of uncompressed standard SU-blocks 30. Alternative embodiments provide for storage and/or transmission of uncompressed standard blocks. For example, standard blocks can be stored in an uncompressed format and then compressed for transmission.

Source system encoder 21 is responsible for including SBIDs in recipe file 23. Encoder 21 divides original file 19 into file blocks, e.g., B-blocks, and generates hashes, e.g., C-hashes, from these blocks. In the illustrated embodiment, encoder 21 first compresses the blocks and then generates hashes from the compressed blocks; in an alternative embodiment, the hashes are generated directly from the uncompressed file blocks. At least some of these hashes, e.g., CQ-hashes 39, are transmitted over network system AP1 to SBID server system 15. SBID server system 15 includes an S-hash to SBID converter 41, which, in turn, includes an S-hash to SBID table 43, which maps S-hashes 44 to SBIDs 29.

In the illustrated embodiments, S-hashes are generated from S-blocks; in an alternative embodiment, hashes are generated from SU-blocks that are uncompressed versions of S-blocks. When it receives a CQ-hash from source system 11, converter 41 checks to determine if the CQ-hash matches an S-hash in table 43. If there is a match, converter 41 returns the associated SBID 45 to encoder 21; in this case, the block from which the matching CQ-hash was generated is identical to a standard block. If the incoming CQ-hash does not match an S-hash entry in table 43, converter 41 returns to encoder 21 a "miss" indication, representing the case when the block from which the CQ hash was generated does not match any standard block. Conveniently, a SBID value such as SBID=0 can be reserved for use as a "miss" indication. Encoder 21 stores each returned SBID 45 in recipe file 23. Encoder 21 also stores in recipe file 23 compressed versions of blocks for which SBID misses occurred.

Figure 2:
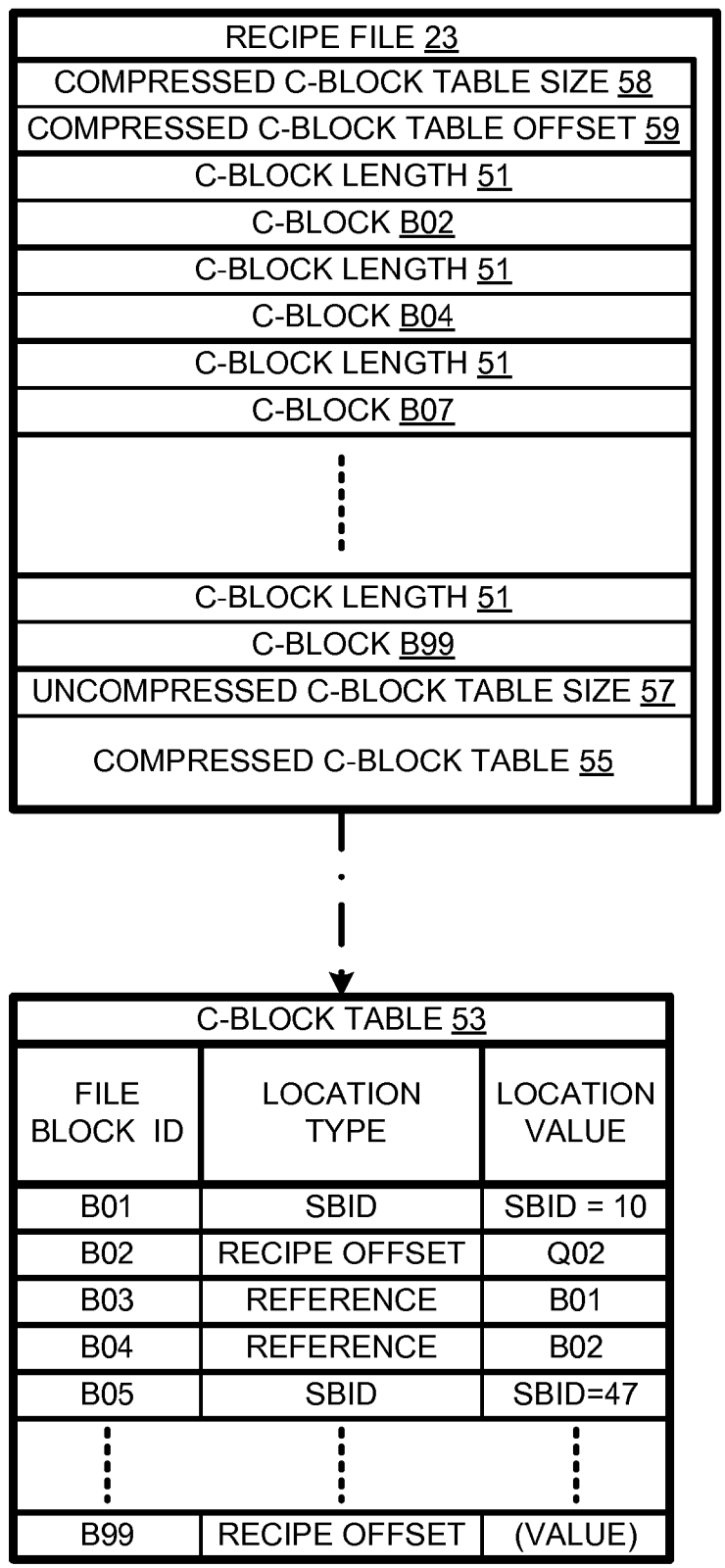
FIG. 2 is a schematic diagram of a recipe file and a file-block table used in the network system of FIG. 1.

Recipe file 23 is represented in greater detail in FIG. 2. The bulk of recipe file 23 is consumed by C-blocks, which are compressed versions of the B-blocks into which encoder 21 divides original file 19. Since C-blocks are compressed and vary in size, respective C-block lengths 51 are specified in recipe file 23 for each C-block stored there. In an alternative embodiment, the size of a compressed block is specified in the block itself.

Not all C-blocks are included in recipe file 23. C-blocks associated with C-hashes other than CQ-hashes and C-blocks that match S-hashes are not included in recipe file 23. However, all C-blocks are represented in a C-block table 53, a compressed copy 55 of which is included in recipe file 23. In addition, recipe file 23 specifies the actual (uncompressed) block table size 57 for table 53, the size 58 of compressed C-block table 55, and the offset location 59 for compressed C-block table 55.

Each B-block is assigned a file-block identifier or "FBID", B01-B99. (For expository purposes, FBIDs are shown ranging from B01-B99, although, in practice, much larger FBID values would be required to handle millions of B-blocks of a virtual-machine image file.) These FBIDs are also used as a key field to identify respective entries in C-block table 53. Associated with each FBID in table 53 are a respective location type and a respective location value. Three types of locations are distinguished. A SBID-type location is defined by a SBID, an offset-type location is defined by an offset within recipe file 23, and a reference-type location is defined by a reference to a FBID. In one embodiment, for a FBID associated with a SBID, decoder 27 will transmit that SBID to SBID server system 15 and use the returned S-block 34 in generating duplicate file 17. For a FBID associated with an offset, decoder 27 will use the C-block at that offset in recipe file 23 in generating duplicate file 17.

For a FBID associated with a reference value, the reference value refers to a different FBID, e.g., one that is associated with a SBID-type location or one that is associated with an offset-type location. For an example of a indirect reference to a SBID-type location, in FIG. 2, FBID B03 has a reference-type location reference to FBID B01, which has a SBID-type reference to SBID=10. Decoder 27 associates the S-block (or a decompressed version of that S-block) associated with the SBID=10 with FBID B03 in generating duplicate file 17. For an example of an indirect reference to an offset-type location, FBID B04 is associated with reference-type location B02. Decoder 27 associates FBID B04 with the C-block at the offset location referred to by FBID B02.

Figure 3:
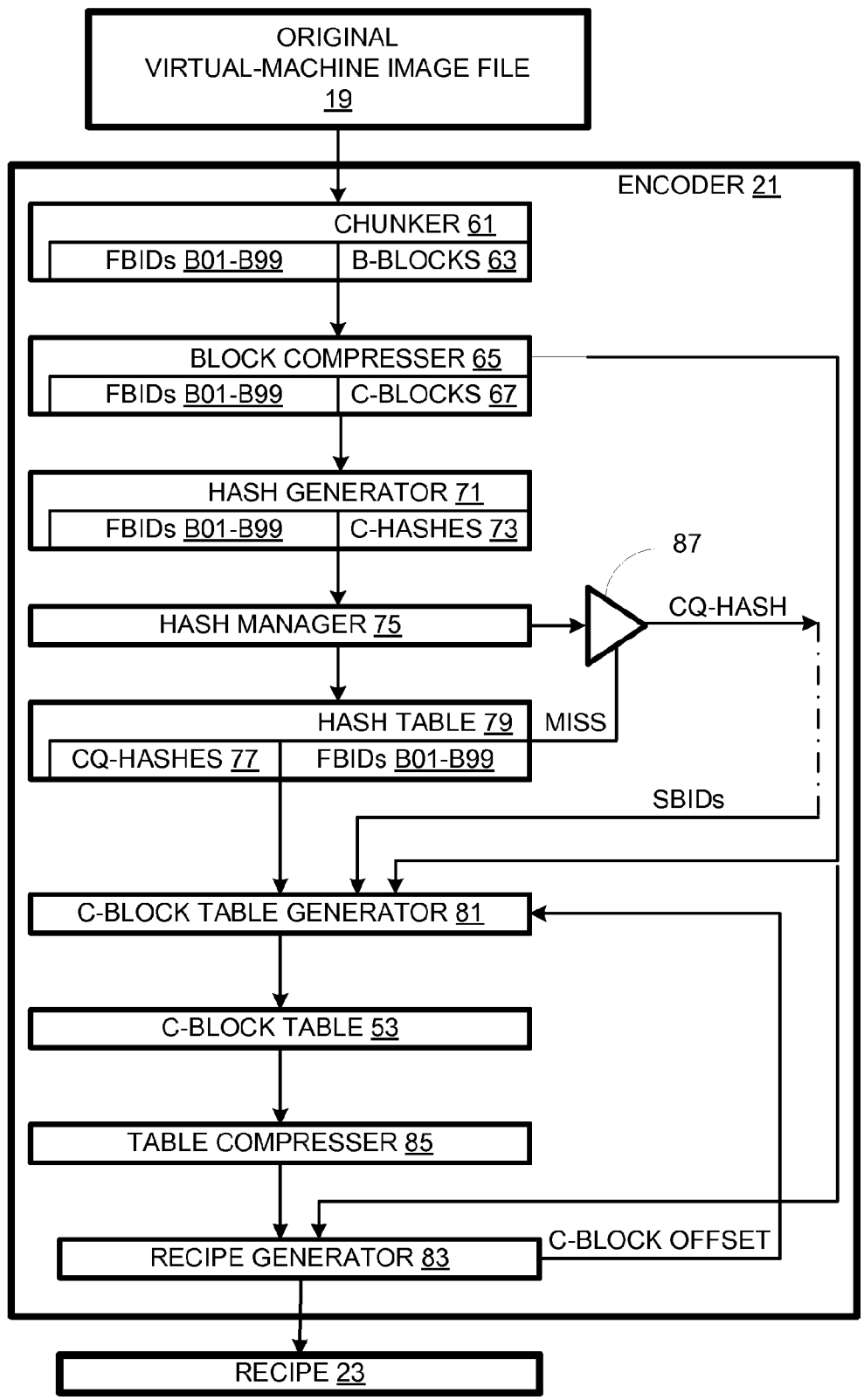
FIG. 3 is a schematic diagram of a file encoder of the network system of FIG. 1.
Figure 4:
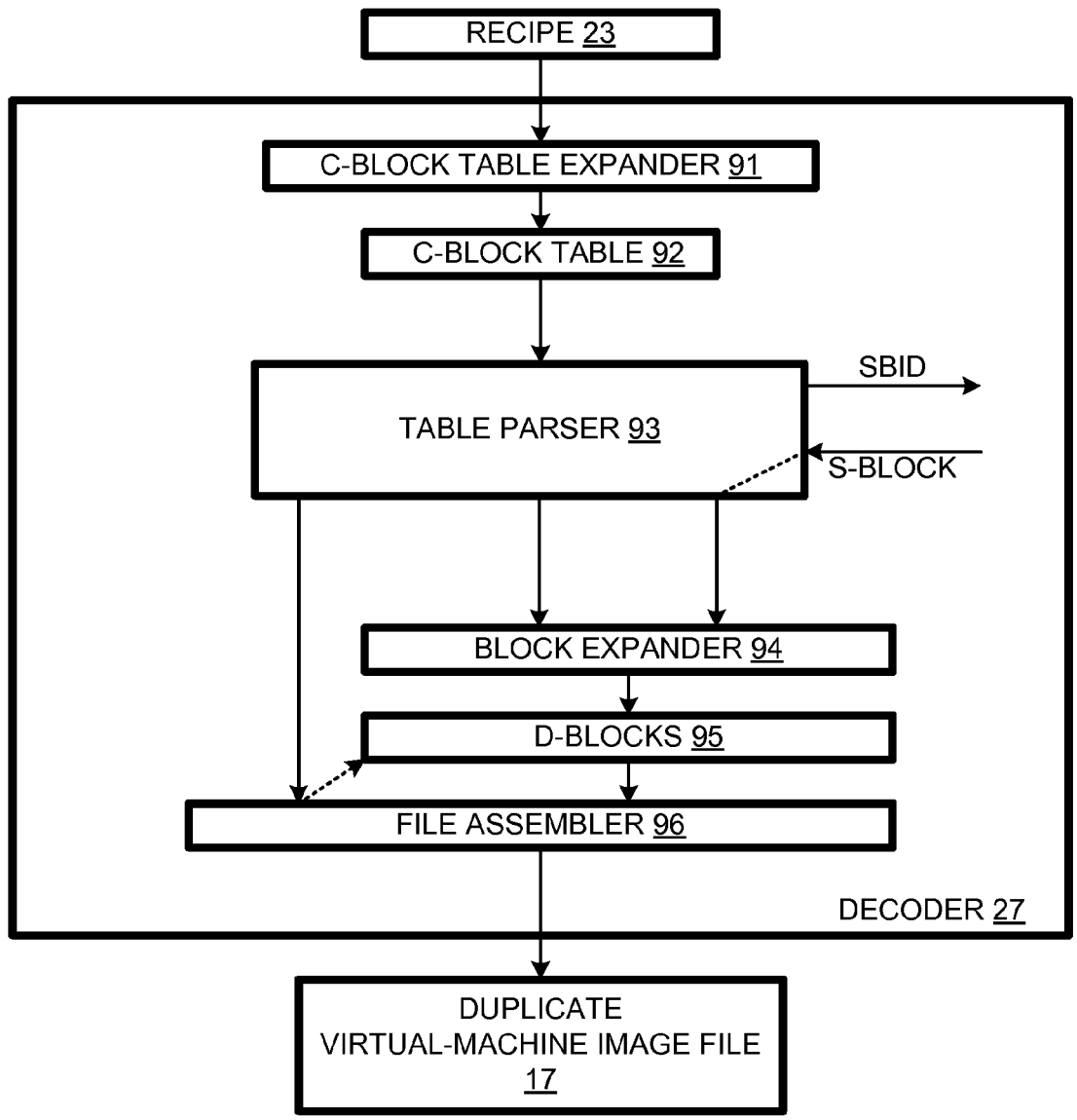
FIG. 4 is a schematic diagram of a file decoder of the network system of FIG. 1.

Encoder 21 is represented in greater detail in FIG. 3. Encoder 21 includes a chunker 61 for breaking original virtual-machine image file 19 into uncompressed B-blocks including B-block 63 of standard size. The size of the B-blocks, 4 kB in this illustrative example, is a compromise between smaller sizes, for which matches are more likely, and larger numbers, which are more difficult to manage. In other embodiment, a different size may be assigned to the B-blocks based on optimization of system performance and the sizes may vary from block to block. Each B-block is assigned a FBID B01-B99 according to its position in original file 19.

A block compressor 54 of encoder 21 compresses B-blocks 63 to yield compressed "C-blocks" 65. Each C-block is associated with the FBID of the source B-block. Since, in general, B-blocks differ in the degree to which they can be compressed. In one embodiment, C-blocks are of different sizes.

A hash generator 71 of encoder 21 generates hashes, namely, C-hashes 69. Each FBID thus has a corresponding C-hash. In the illustrated embodiment, the C-hashes are generated directed from the C-blocks and thus indirectly from the B-blocks. In an alternative embodiment, B-hashes are generated directly from the B-blocks; in this latter embodiment, the hashes representing standard blocks are generated from uncompressed versions of those blocks.

Hash generator 71 uses an SHA-2 algorithm that generates 256-bit hashes, also known as "fingerprints", "signatures", and "digests", so comparisons are between 32-byte values as opposed to 4 kB values. Two blocks with different hashes are necessarily different. SHA-2 hashes are collision resistant, so it is very unlikely that two blocks with the same hash will be different. To avoid any possibility of a mismatch, bit-wise comparisons of the full blocks can be used to confirm a match indicated by a comparison of hashes. SHA-2 hashes also have security-related cryptographic properties that make it hard to determine a block from its hash. Alternative embodiments use other hash algorithms, e.g., SHA-1, and MD5.

A hash manager 75 of encoder 21 processes C-hashes 73. In the illustrated embodiments, C-hashes are handled serially. An alternative embodiment processes groups of hashes in parallel to enhance performance. Hash manager 75 determines, for each C-hash, whether it matches one of the CQ-hashes 77 in a hash table 79. For the first C-hash to be processed, hash table 79 is empty, so a miss occurs. In the event of a miss, hash manager 75 transmits a compressed-query CQ-hash copy of the unmatched C-hatch to SBID server system 15; in FIG. 3, this functionality is represented by a gate 87 that is enabled by a miss indication and disabled by a "no-miss" or "hit" indication. Also, hash manager 75 enters the CQ-hash into hash table 79, associating it with the FBID of the source C-hash. In the case of the first C-hash, this FBID is B01.

For the second and subsequent C-hashes processed by hash manager 75, a hit or miss is possible. As described above, in the event of a miss, a CQ-hash is transmitted and a corresponding entry is added to hash table 79. In the event of a hit, no CQ-hash is transmitted or entered into hash table 79. The non-CQ C-hash is referred to herein as a "compressed reference hash" or "CR-hash". A C-block table generator 81 of encoder 21 associates the FBID of the matching CQ-hash with the FBID for the CR-hash entry in C-block table 53.

When encoder 21 transmits a CQ-hash to SBID server system 15, either a positive SBID or a "miss" indication (SBID=0) will be returned. In the case a positive SBID is returned, the associated CQ-block is presumed to be identical with a respective S-block. Accordingly, C-block table generator 81 associates that SBID with the FBID for the CQ-hash being processed in C-block table 53.

In the case a miss indication (SBID=0) is returned, the associated C-block does not match a S-block and cannot be represented by a SBID. Accordingly, a recipe generator 83 of encoder 21 includes the unmatched C-block in recipe file 23 at a respective offset location, e.g., offset location Q02, within recipe file 23. C-block table generator 81 then associates that offset location with the FBID of the CQ-hash being processed. Since compressed files are of different sizes, recipe generator 83 associates each non-standard CQ-block with a length specification 51 (FIG. 2) so that the start positions of the next item in recipe file 23 can be readily calculated.

Once all FBIDs are processed, a table compressor 85 of encoder 21 compresses C-block table 53 to yield compressed C-block table 55 (FIG. 2). Recipe generator 83 then inserts compressed C-block table 55 into recipe file 23, along with an actual (uncompressed) size specification 57, a compressed table-size specification 58, and an offset-location specification 59 information for compressed C-block table 55. The resulting recipe file 23 is then transferred from source system 11 to target system 13, where it is referred to herein as recipe file 23.

Decoder 27 includes a C-block table expander 91 for expanding compressed C-block table 55 of recipe file to yield on target system 13 a C-block table 92, which is a duplicate of C-block table 53 on source system 11. A C-block table parser 93 of decoder 27 handles table entries serially. For a FBID associated with a SBID, parser 93 engages SBID server system 15 to exchange the SBID for the S-block it represents. The returned S-block is expanded by block expander 94 to yield a "decompressed block" or "D-block" 95. A file assembler 96 of decoder 27 inserts the D-block into duplicate file 17.

For a FBID associated with a recipe-file offset, table parser 93 extracts the associated C-block from recipe file 23 and provides it to block expander 94. Block expander 94 generates a decompressed D-block that file assembler 96 inserts into duplicate file 17. For a FBID associated with a previously processed FBID, parser 93 conveys the identity of the previously processed FBID to file assembler 96. File assembler 96 then inserts a copy of the associated D-block in a file location associated with the currently processed FBID.

Figure 5:
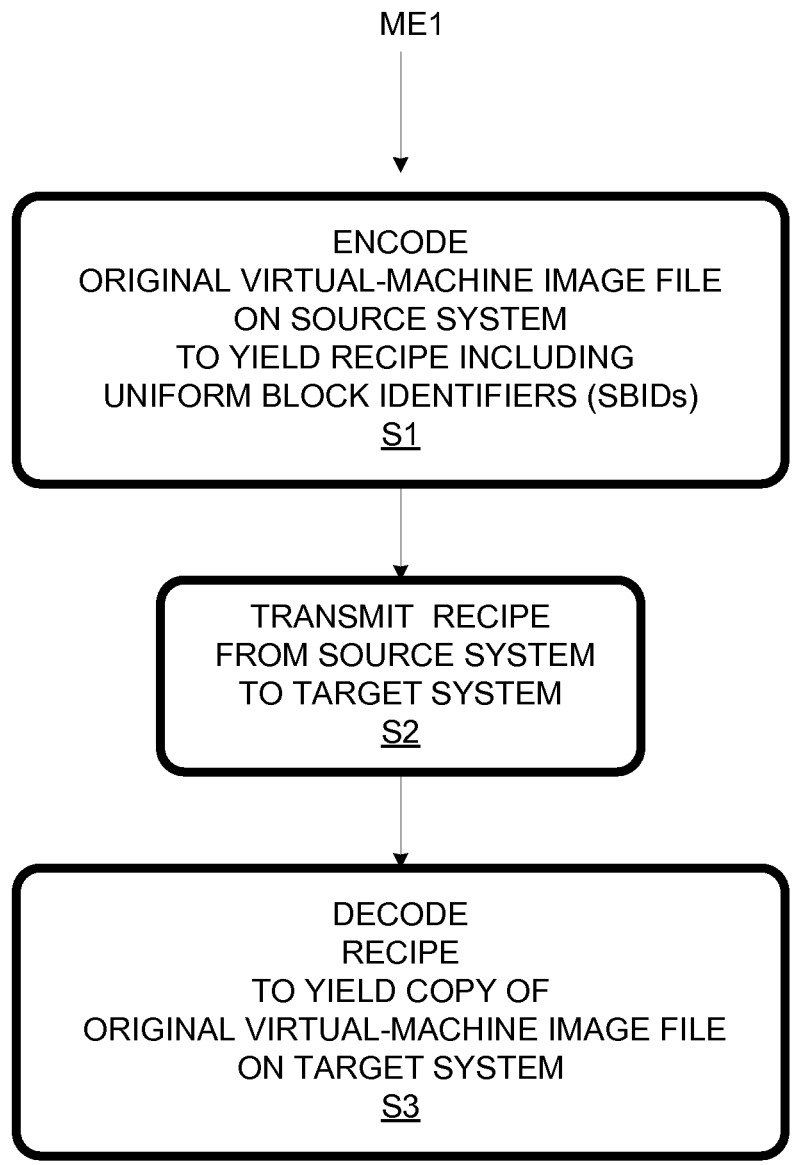
FIG. 5 is a flow chart of a method practiced in the context of the network system of FIG. 1 in accordance with the present invention.

An encode-transfer-decode method ME1 of the invention is flow-charted in FIG. 5. Step S1 involves encoding a virtual-machine image file on a source system to yield a recipe file including SBIDs. Step S2 involves transferring the recipe file from a source system over a network to a target system. Step S3 involves decoding the recipe file to yield duplicate virtual-machine image file 17, which is identical to original virtual-machine image file 19.

Figure 6:
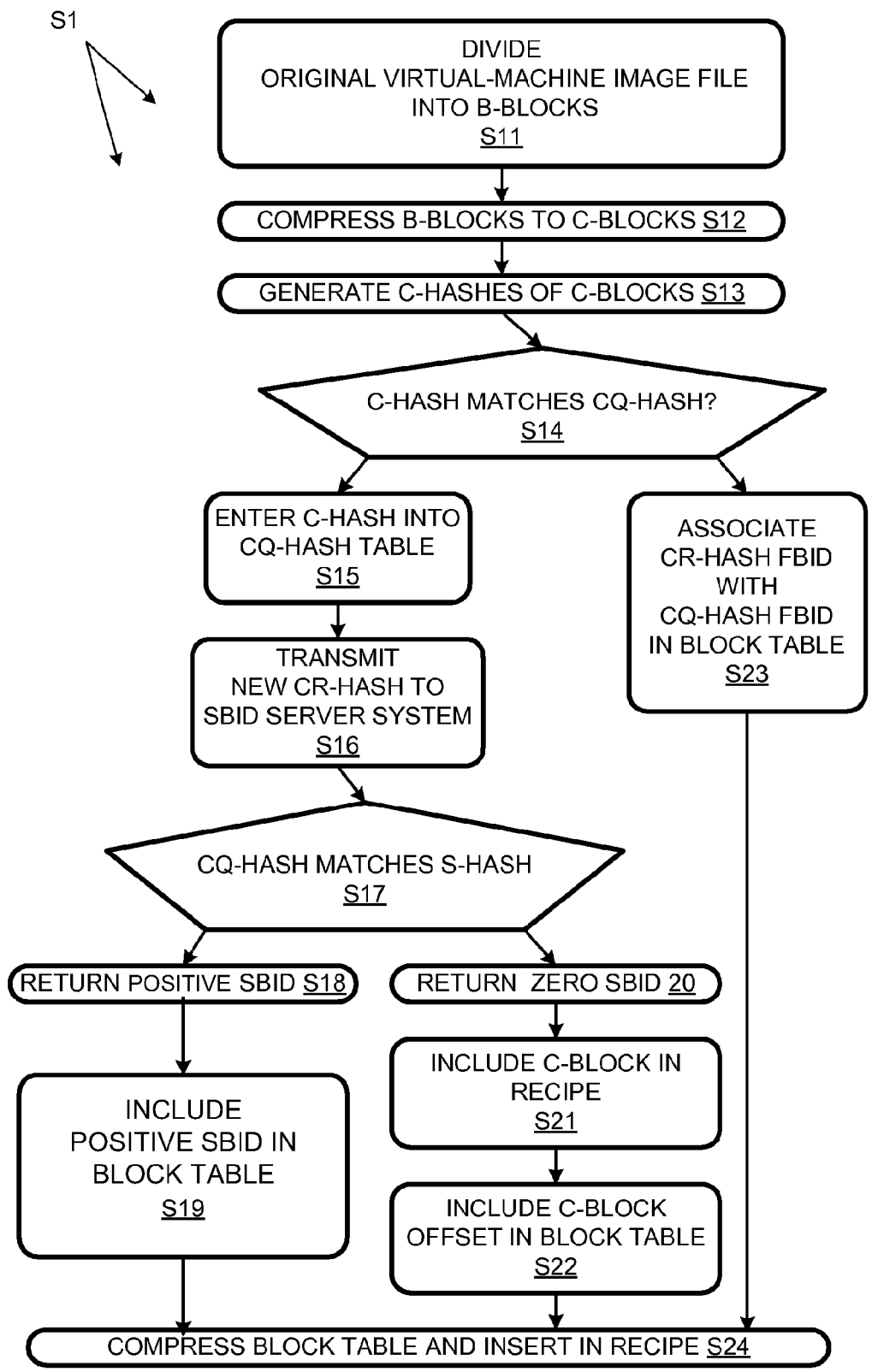
FIG. 6 is a flow chart of an encoding step of the method of FIG. 5.

Encoding step S1 is flow-charted in greater detail in FIG. 6. At step S11, chunker 61 divides original file 19 into uncompressed B-blocks. In the illustrated embodiments, a file system on source system 11 stores original file 19 in 4 kB blocks, and these pre-existing blocks become the B-blocks. In alternative embodiments, existing block divisions are ignored and this dividing step S11 creates new blocks. In either case, the B-blocks can be can assigned respective serial FBIDs B01-B99.

At step S12, the B-blocks are compressed to yield respective compressed C-blocks. In an alternative embodiment, an original file is stored as a set of compressed blocks so no separate block compression step is used.

At step S13, hashes are made for one of the versions of the B-blocks. In the illustrated embodiment, C-hashes are made from C-blocks. In some alternative embodiments, the hashes are generated directly from pre-compressed or uncompressed B-blocks. Each C-hash is associated with the FBID associated with the B-block from which it was directly or indirectly generated.

Beginning with step S14, operations are logically ordered by FBID. In the illustrated embodiment, blocks and hashes are processed in order of their FBIDs, e.g., the C-hash with FBID B01 is processed before the C-hash with FBID B02. In an alternative embodiment, the C-hashes are arranged in groups and the C-hashes within each group are processed in parallel. In some of these parallel embodiments, measures are taken so that the ordering effects associated with serially processing are also obtained despite parallel processing of hashes.

At step S14, a determination is made whether the currently processed C-hash matches a previously processed C-hash. In the illustrated embodiment, this determination is made by inputting the current C-hash to hash table 79, which is initially empty. Thus, no match is found for the first C-hash, associated with FBID B01, which thus is recognized as a CQ-hash. When no match is found, a new entry is made to table 79 at step S15; thus an entry associating FBID B01 with the current CQ-hash is made to table 79. Also, the non-matching CQ-hash is transmitted to SBID server system 15 at step S16.

At step S17, server system 15 determines whether or not a received CQ-hash matches an S-hash in S-hash to SBID table 43. In the case of the CQ-hash associated with FBID B01, a match with an S-hash is found. This means that the B-block associated with FBID B01 matches a standard SU-block. As a result, target system 13 will be able to retrieve an S-block from SBID server system 15 instead of a C-block from source system 11. In the illustrated embodiment, the standard blocks are stored in compressed form, so the actual match is between a C-block and an S-block.

At step S18, in response to an S-hash match, SBID server system 15 returns a SBID to source system 11. At step S19, the returned SBID is associated with the FBID for the matching CQ-hash in block table 53.

If at step S17, the current CQ-hash does not match an S-hash, SBID server 15 returns to source system 11 a "miss" indication at step S20. In the illustrated embodiment, a SBID value of zero is reserved as a miss indication. At step S21, the current C-block is written to an offset location within recipe file 23. At step S22, the offset location is associated with the current FBID in block table 53. Thus, since the CQ-hash associated with FBID B02 does not match an S-hash, the offset value for the associated CQ-block in recipe file 23 is associated with the current FBID in block table 53.

At step S14, a CQ-hash is generated from the current C-hash only if the latter fails to match an entry in hash table 79. If the current C-hash matches a hash in table 79, then the current C-hash is identical to a previously processed C-hash. Presumably, the corresponding file blocks match as well. Accordingly, a reference to the block corresponding to the previously processed CQ-hash is made in block table 79 at step S23. In other words, a reference-type entry to the FBID for the previously processed CQ-hash is associated with the current FBID in table 79.

For example, the CR-hash having FBID B03 matches the CQ-hash associated with FBID B01 in hash table 79. As a result, the SBID associated with FBID B01 is indirectly associated with FBID B03 in block table 53. For another example, the CR-hash having FBID B04 matches the CQ-hash associated with FBID B02 in hash table 79. As a result, the C-block associated with FBID B02 will be indirectly associated with FBID B04 by virtue of block table 53. Once all C-hashes are processed (steps S14-S23), block table 53 is compressed to yield compressed block table 55, which is inserted into recipe file 23 at step S24. Recipe file 23 is then transferred to target system 13 at step S2 (FIG. 5).

Figure 7:
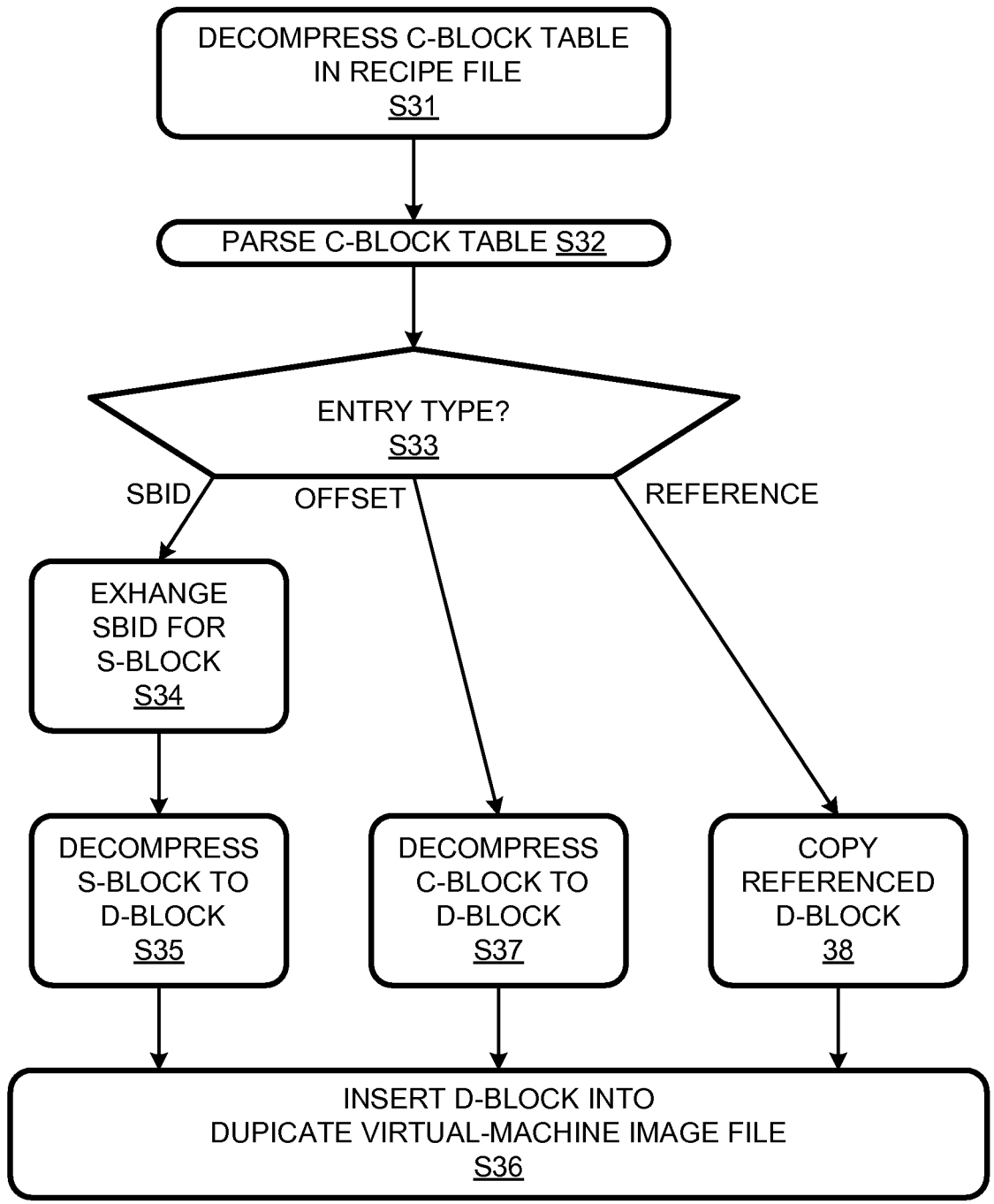
FIG. 7 is a flow chart of a decoding step of the method of FIG. 5.
Figure 8:
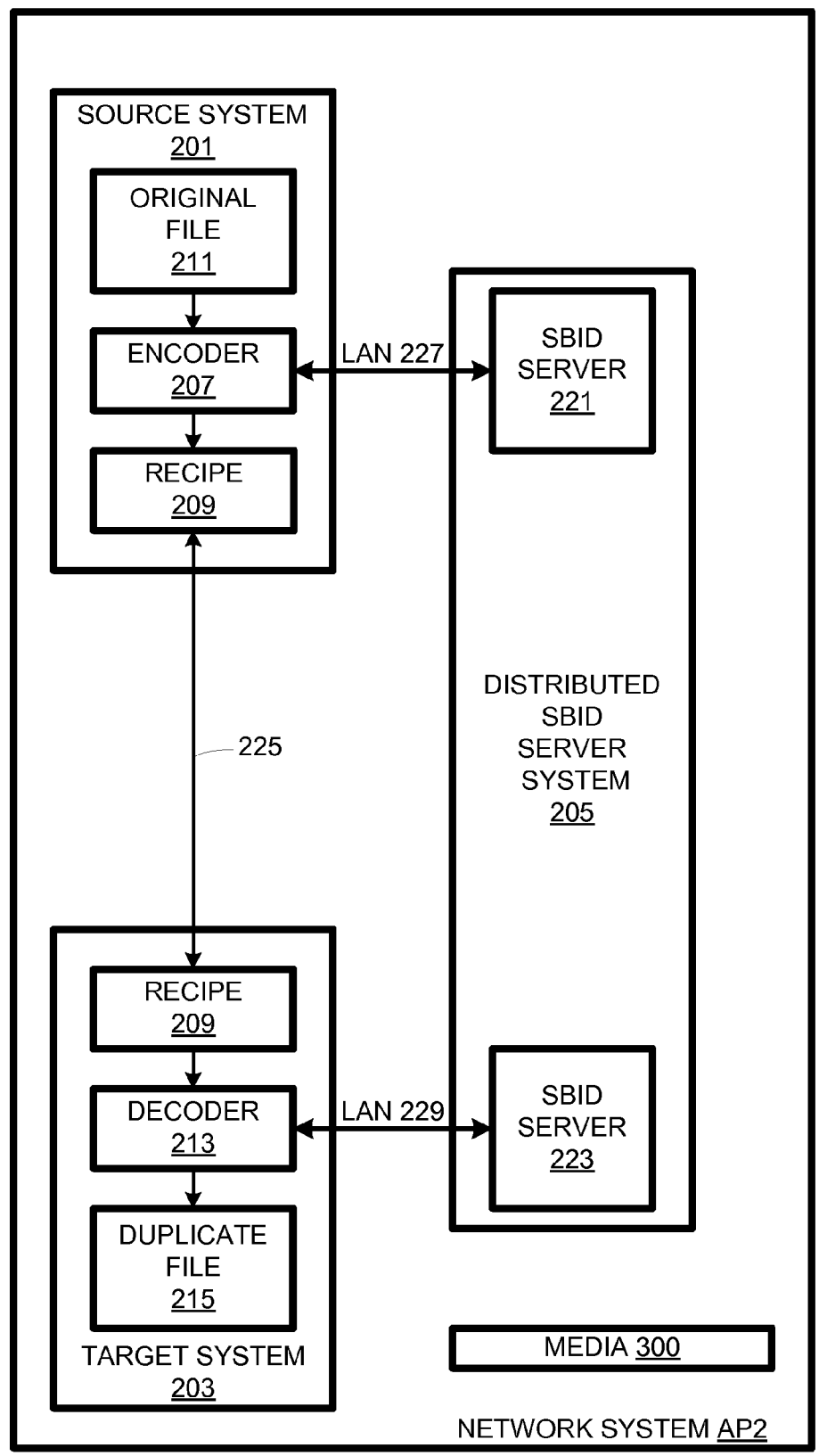
FIG. 8 is a schematic diagram of an alternative network system in accordance with the present invention.

Decoding step S3 is detailed in the flow-chart of FIG. 7. At step S31, compressed C-block table 55 in recipe file 23 is decompressed to yield C-block table 92, a duplicate of C-block table 53. In one embodiment, C-block table 53 stores FBIDs, SBIDs and Offsets of C-blocks stored in the recipe. At step S32, parser 93 parses C-block table 92 in FBID order.

Further processing of a C-block table entry depends on the entry type, as determined at step S33.

In the case of a SBID-type entry, the SBID is exchanged for an S-block at step S34. In particular, target system 13 transmits the SBID to SBID server system 15, which returns an S-block to be associated with the current FBID. This S-block is decompressed at step S35 to yield a decompressed "D-block". The D-block is inserted into duplicate virtual-machine image file at step S36.

In the case of an offset entry, the C-block at the referenced offset location in recipe file 23 is decompressed at step S37 to yield a D-block, which is inserted in duplicate file 17. In the case of a reference entry, a copy is made of a previously decompressed D-block; the copy is then inserted in duplicate file 17. In the case of indirected files, this can simply mean that a duplicate block pointer is inserted in the metadata for the file. Once all entries of table 92 have been processed, duplicate virtual-machine image file 17 is complete.

A second network system AP2 comprises a source system 201, a target system 203, and a distributed SBID server system 205. Source system 201 includes an encoder 207 for generating a recipe 209 from an original file 211. Target system 203 includes a decoder 213 for generating a duplicate file 215 identical to original file 211 from recipe 209, which is a copy of recipe 209 transferred from source system 201 to target system 203. SBID server system 205 includes two SBID servers 221 and 223 that are essentially identical with each other and with SBID server system 15 of network system AP1.

Network system AP2 provides for a relatively slow Internet connection 225 between source system 201 and target system 203. It is over this Internet connection 225 that recipe file 209 is transferred from source system 201 to target system 203 to yield recipe file 209. Network system AP2 also provides: 1) a relatively fast local-area network (LAN) connection 227 between encoder 207 and SBID server 221; and 2) a relatively fast LAN connection 229 between decoder 213 and SBID server 223. This means that SBID requests by encoder 207 are filled quickly and, more significantly, S-block requests by decoder 213 are filled quickly. Thus, system AP2 not only relieves source system 201 from having to transfer standard blocks, but also provides for much more rapid transfer of standard blocks than source system 201 could provide. Thus, steps S16-S18 in FIG. 6 and step S34 in FIG. 7 can be performed at higher speeds in the context of system AP2 than in the context of system AP1.

System AP2 also includes a manufacture in the form of computer-readable storage media 300 on which is encoded all data and programs of computer-executable instructions required for implementing method ME1 on either system AP1 or AP2, including encoders, decoders, converters, original files and, when generated, duplicate files and recipe files.

The strategy of using localized SBID servers can also be employed by having a source system or a target system or both keep track of standard blocks represented on their system. Thus, when a SBID is returned to a source system, the source system can maintain a SBID table mapping that SBID to the corresponding B-block. Likewise, when a target system receives an S-block, it can keep track of the location of the resulting D-block and the SBID used to fetch the S-block. The next time a SBID is required or an S-block is required, a local SBID table can be checked and, in the event of a hit, an exchange with a SBID server system omitted.

In some embodiments, encryption is used. For example, the recipe file can include encrypted versions of compressed file blocks and SBID server system can store and/or transmit encrypted versions of standard blocks. File hashes can be generated from any version of a file block and standard hashes can be generated from any version of a standard block. In some embodiments, the version from which a standard hash is generated is not the same as the version of the S-block that is returned to the target system. File or standard hashes generated directly from any version of a file or standard block are said to be generated (directly or indirectly) from the standard or file block.

As those skilled in the art will understand, and as explained throughout the foregoing description, the present invention provides for a variety of alternative embodiments. These and other variations upon and modifications to the illustrated embodiment are provided by the present invention, the scope of which is defined by the following claims.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A computer-implemented method comprising:
    converting by a processor of a source system an original file into original blocks;
    generating hashes from said original blocks;
    transmitting some of said hashes over a network to a server system and, in response thereto, receiving, from the server system, identifiers of standard blocks having hashes that match one of the hashes transmitted over the network;
    generating a recipe file including the received identifiers; and
    transferring over said network said recipe file to a target system.

2. The computer-implemented method as recited claim 1 further comprising:
    in response to said transmitting, further receiving from the server system an indication that a hash generated from an original block and transmitted to the server system does not match a hash of a standard block; and
    responsive to receiving said indication in response to transmitting said hash, including in said recipe file a compressed version of the original block from which said hash was generated.

3. The computer-implemented method as recited in claim 1 further comprising decoding said recipe file at the target system to yield a duplicate file of said original file.

4. The computer-implemented method as recited in claim 3 wherein said decoding involves:
    transmitting identifiers included in said recipe file from said target system over said network to said server system; and
    in response to said transmitting, receiving at said target system a compressed version of standard blocks from said server system.

5. The computer-implemented method as recited in claim 1 wherein said original file is a virtual-machine image file.

6. A non-transitory computer-readable storage media encoded with instructions executable by a processor to cause the processor to perform a method comprising the steps of:
    dividing an original file into file blocks;
    compressing said file blocks to yield compressed file blocks;
    generating hashes from said compressed file blocks;
    generating a recipe file by processing said hashes to determine whether each of said hashes that are currently processed matches a previously-processed hash;
        responsive to determining that a currently-processed hash matches a previously-processed hash, associating an identifier for the currently-processed hash with an identifier for the matching previously-processed hash, and
        responsive to determining that the currently-processed hash does not match a previously-processed hash, transmitting the currently-processed hash to a server system and, responsive to receiving an identifier from the server system in response to said transmitting, including the identifier in said recipe file.

7. The non-transitory computer-readable storage media as recited in claim 6 wherein, responsive to said server system returning an indication that said currently-processed hash does not correspond to a standard block, including a copy of a compressed file block from which said currently processed hash was generated in said recipe file.

8. The non-transitory computer-readable storage media as recited in claim 6 wherein the method further comprises the step of:
    transmitting said recipe file from a source system to a target system,
    said recipe file being decoded at the target system to yield a duplicate file of said original file.

9. The non-transitory computer-readable storage media as recited in claim 6 wherein said original file is a virtual-machine image file.

10. A computer system having source, target, and server systems connected over a network, wherein the source system has an original file that is to be duplicated at the target system, and the server system comprises:
- a storage unit for storing standard data blocks of the original file in a predetermined format;
- a first converter, executing in a processor of the server system, that receives hashes from the source system over the network, compares the received hashes with hashes generated from the standard data blocks, and transmits to the source system over the network, identifiers of the standard data blocks that have hashes that match one of the received hashes; and
- a second converter, executing in the processor of the server system, that receives identifiers of standard data blocks from the target system over the network, and transmits to the target system over the network, the standard data blocks that are associated with the received identifiers.

11. The computer system as recited in claim 10 wherein said first converter, in response to receiving from said source system a hash that is not identical to a hash of any of said standard data blocks, returns an indication that the received hash does not correspond to any of said standard data blocks.

12. The computer system as recited in claim 11 wherein said source system includes an encoder for generating a recipe file by encoding the original file, and said target system includes a decoder for generating a duplicate of said original file by decoding said recipe file, said recipe file including identifiers of standard data blocks and a compressed version of file blocks of said original file.

13. The computer system as recited in claim 12 wherein said source system includes a chunker for dividing said original file into file blocks, and a hash generator for generating hashes from said file blocks.

14. The computer system as recited in claim 12 wherein said original file is a virtual-machine image file.

* * * * *